Jan. 2, 1951    C. GAHAGAN    2,536,273
SWITCH OPERATED BY FLOAT ACTUATING MECHANISM
Filed Nov. 2, 1949
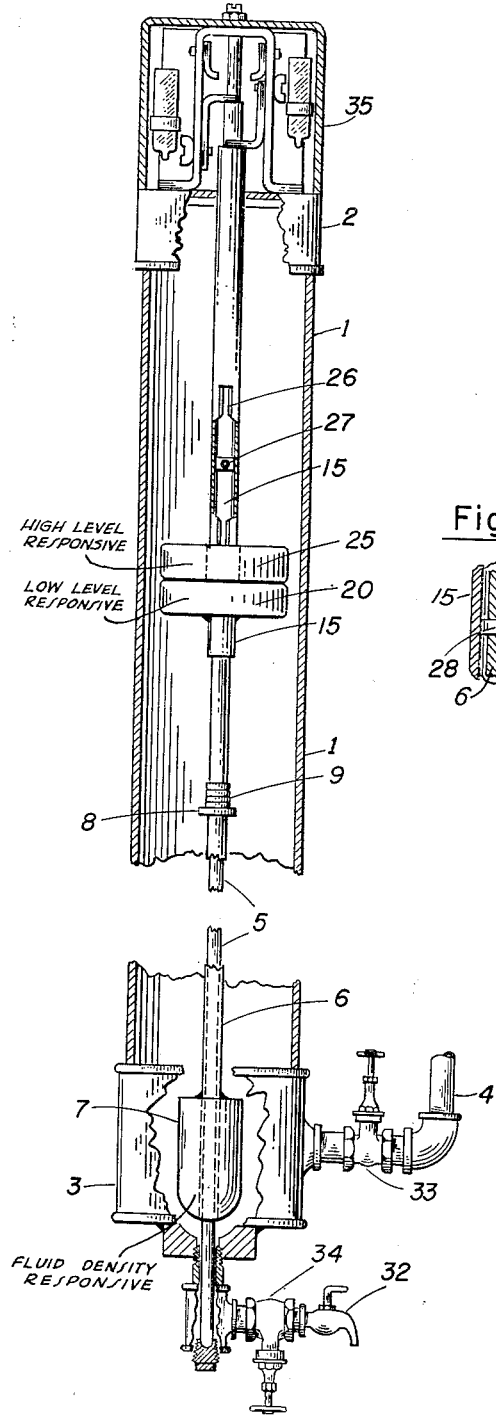
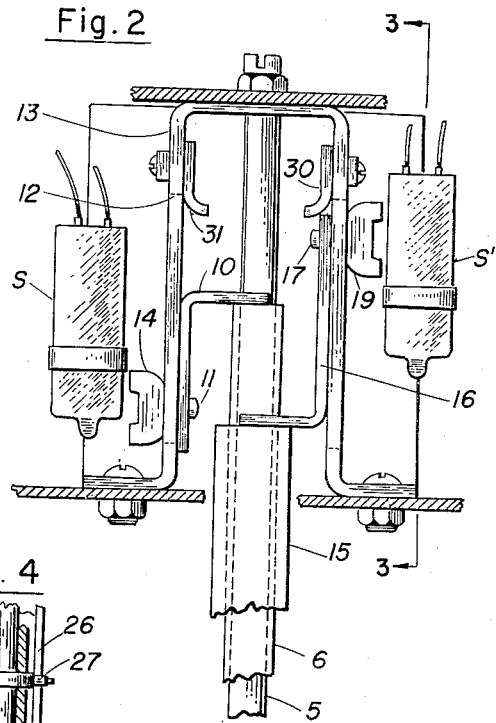
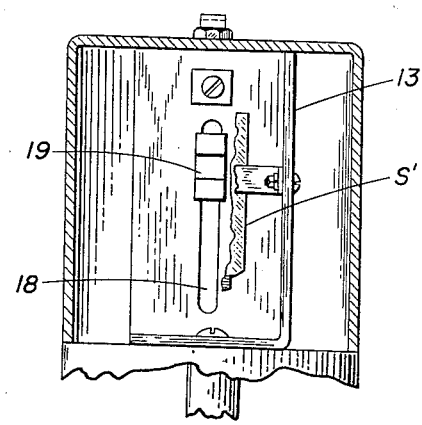
Inventor
CLOY GAHAGAN
By
George K. Hellert
Attorney Patented Jan. 2, 1951

2,536,273

UNITED STATES PATENT OFFICE 2,536,273

SWITCH OPERATED BY FLOAT ACTUATING MECHANISM

Cloy Gahagan, Darlington, Md.

Application November 2, 1949, Serial No. 125,084

7 Claims. (Cl. 200—84)

1

This invention relates to an alarm system for association with a vessel containing a fluid, and is particularly directed to mechanism for detecting and indicating variations in total volume of lubricating oil or the like contained in a tank or reservoir and introduction into the reservoir of a foreign fluid of different specific gravity such as water.

The said mechanism is especially adapted for use in connection with the lubricant tank or housing surrounding and at least partially enclosing the upper main bearings of large hydroelectric generator turbines in which a bath of oil is maintained in contact with the bearing surfaces and prevented from overheating by coils in the tank through which water is circulated as a coolant.

For satisfactory operation of turbines having bearings of this character, in which the turbine rotor operates at relatively high speed about a vertical axis and its upper main bearing therefore receives thrust stresses of large magnitude, it is essential not only that the quantity of oil in the tank be kept fairly constant at level sufficient to keep the bearing surfaces submerged and to insure this that a signal be given in the event of material increase or decrease of the total oil volume, but also that the operatives in charge be immediately apprised of contamination of the oil by leakage thereinto of water from the cooling coils or elsewhere so that proper remedial measures can be adopted before serious damage to the equipment results.

Liquid level indicators including floats adapted to actuate visual and/or audible signals have heretofore been suggested for indicating changes in the volume of lubricant in the tanks surrounding the bearings of such turbines, but as far as I am aware these have been responsive only to changes in total volume of liquid and incapable of discriminating between lubricant fluid and a contaminant such as water, with the result that no signal or alarm is given thereby should lubricant escape and water enter the reservoir in corresponding quantity and so maintain a substantially constant total fluid volume therein; hence should such a condition occur material injury to the bearings may result from the entry of water without appreciable accompanying change in volume, and hence without its presence being noted before the equipment has been damaged.

It is therefore a principal object of the invention to provide mechanism for promptly energizing an alarm or other suitable signal when the total fluid volume in a fluid containing tank or reservoir becomes greater or less than values within a predetermined range and also, substantially independently of the volume of said fluid, should a contaminating fluid of different specific gravity be admitted accidentally to the tank as by leakage from a cooling coil, conduit or other source.

A further object is to provide in combination with means for indicating when the quantity of oil in a turbine bearing lubricating tank or the like exceeds or is exceeded by the limits of a given range, means operative to promptly actuate an alarm signal should water or other non-lubricating fluid of higher specific gravity than the oil enter the tank and thereby apprise the operatives of the existence of a condition not readily observable but which would result in injury to the turbine bearings if the turbine were kept in operation.

Other objects, purposes and advantages of the invention will hereafter more fully appear or will be understood from the following description of and the accompanying drawing illustrating one embodiment of it adapted for use in association with the lubricant containing housing surrounding the upper main bearing of a hydroelectric generator turbine.

In the said drawing,

Fig. 1 is a front elevation, partly in section, of the alarm actuating mechanism;

Fig. 2 is a fragmentary enlarged front elevation showing the parts thereof directly associated with the alarm energizing circuits;

Fig. 3 is a similarly enlarged fragmentary section on the line 3—3 in Fig. 2, and Fig. 4 is a fragmentary enlarged detail in side elevation of a portion of Fig. 1.

Referring now more particularly to the drawing, the mechanism illustrated therein comprises a tubular casing 1 adapted to be installed and supported in upright position adjacent a turbine bearing housing or the like (not shown) and provided at its ends with caps 2, 3. This casing is connected through a conduit 4 with the lower part or bottom of the lubricant reservoir of the housing or preferably with the drain pipe extending downwardly therefrom whereby when the conduit is open a level of fluid in the casing corresponding to that in the reservoir is maintained by hydrostatic pressure in the latter. Within the casing 1 and extending axially thereof is fixedly supported a guide rod 5 on which is slidably mounted an elongated sleeve 6 carrying at its lower end a sealed hollow bulb 7 either evacuated or containing air. Above this bulb at a convenient point on sleeve 6 is fixed a collar 8 supporting on the sleeve a plurality of annular weights 9 of which any suitable number may be employed as will hereafter appear; preferably these weights are so designed they may be applied to or removed from the sleeve at will so as to increase or decrease their total mass. Resting on the upper end of the sleeve and movable with it is a bracket 10 carrying a pin 11 vertically slidable in a slot 12 in one arm of a U-shaped yoke 13 seating on and fixed to upper cap 2 of the casing, the pin on the opposite or outer side of the arm supporting a permanent magnet 14 or other suitable switch actuating element which is thus vertically slidable relatively to the yoke.

For translating motion of the sleeve and hence of the magnet into electrical circuit control for energizing an alarm or signal device (not shown) I may employ a magnetically energized switch S of any well known type responsive to movement of magnet 14, the switch being suitably supported upon the yoke adjacent the path of the magnet and arranged to break or make a circuit to thereby operate any desired type of alarm device adapted to give an audible, a visual, or a graphic indication whereby vertical movement of sleeve 6 upwardly beyond a predetermined limit is reflected in a perceptible signal as will be hereafter more fully explained.

Surrounding and freely slidable on sleeve 6 is a somewhat shorter outer sleeve 15, supporting at its upper end a bracket 16 carrying a pin 17 similarly slidable in a slot 18 in the other arm of yoke 13 and supporting another switch actuating element such as magnet 19 for actuating in like manner a switch S', or other equivalent circuit controlling means, connected through suitable wiring with a second alarm device (not shown) which desirably is adapted to give a different kind of alarm or signal than the device actuated from switch S so as to differentiate therefrom.

A hollow annular float 20 is secured to outer sleeve 15 at a suitable point and is sealed to confine a vacuum or air whereby the float supports sleeve 15 at a level such as to maintain switch S' inactive when the fluid in casing 1 and hence in the reservoir with which it is connected is at the proper operating level.

Another annular hollow float 25 also surrounds sleeve 15 but is freely slidable thereon and normally rests upon float 20, the latter being made with buoyancy sufficient to support float 25 as well as sleeve 15, and a slot 26 in sleeve 15 provides a guide for a pin 27 extending radially from a vertically adjustable collar 28 (Fig. 4) on the inner sleeve 6 and overlying slidable float 25 for engagement therewith when the float rises on the outer sleeve for the distance determined by the adjusted position of the collar.

Bracket 16 supported by the upper end of outer sleeve 15 is adapted to engage a, preferably adjustable, stop 30 carried by yoke 13 near its upper end after it has been lifted by float 20 to a predetermined height corresponding to normal lubricant level, and it is only after such engagement of this bracket with the stop that float 25 can rise individually on the sleeve and so away from float 20 to engage pin 27. After such engagement however, further upward travel of float 25 lifts the inner sleeve and under certain conditions this movement can proceed until bracket 10 supported on inner sleeve 6 engages a stop 31 also carried by the yoke.

At its lower end the casing is provided with a drain cock 32 to allow the fluid in it to be bled away when desired, and valves 33, 34 respectively in conduit 4 and the drain cock line allow a body of fluid in the casing to be held static therein for testing or the like, while the yoke 13 and associated parts are preferably enclosed in a removable dust cover or housing 35.

The alarm actuating mechanism herein described when initially installed is provided with weights 9 of sufficient mass to hold sleeve 6 and its attached parts "floating" in lubricant in the casing through the buoyancy of bulb 7 and at a level insufficient to actuate switch S when the lubricant level is such as to hold float 20 and outer sleeve 15 at a level higher than that at which switch S' is actuated. So long as this level of lubricant is maintained switches S and S' therefore remain inactive and no alarm is given.

Assuming now, however, that lubricant escapes from the bath; the level in casing 1 consequently falls and float 20 and hence outer sleeve 15 and magnet 19 therefore descend, actuating switch S' to break or make the alarm circuit and so signal that the total lubricant volume in the bath is insufficient.

If additional lubricant now be supplied float 20 is of course correspondingly raised to the point at which stop 30 is engaged by its bracket which of course corresponds with the normal level of lubricant in the reservoir but if still more is supplied, thus creating an excess over the proper amount float 25 rises free of float 20 and after engaging pin 27 ultimately lifts inner sleeve 6 sufficiently to actuate switch S and so warn through the alarm signal controlled thereby that too much lubricant has been added.

These operations, it will be understood, are results solely of hydrostatic pressure and give indications only of the total fluid volume in the tank whether this be oil alone or oil contaminated with water. Assuming however that, with the volume of oil remaining substantially constant at the desired value, a little water leaks into it from the cooling coils or elsewhere; being heavier than the oil the water promptly passes to the bottom of the reservoir and thence through conduit 4 into casing 1. If of sufficient volume to force the oil out of conduit 4 the water may raise the oil level in casing 1 above that in the bearing bath and by hydrostatic pressure alone lift float disc 25 sufficiently to give an alarm before any appreciable quantity of it has actually entered casing 1. But should it seep relatively gradually into the latter reliance solely upon the increased total fluid volume in the system would result in introduction of a deleterious quantity of water before alarm were given. It will be apparent however that in accordance with my invention when water in any manner enters the casing 1 in appreciable quantity it surrounds float 7 near the bottom of the casing and due to the float assembly being weighted so that uncontaminated oil normally supports it at a level just below that at which switch S is actuated, the water, being of greater density than oil, causes the float 7 to rise higher than it would if the same volume of oil instead of water were added to the system. Consequently, after the admission of very little water into the casing the switch S is actuated to give an alarm even before the increase in the total volume of oil and water in the system becomes sufficient to lift the tube 6 through the medium of float 25. Furthermore, even if water passes into the system contemporaneously with the escape of oil therefrom at the same rate, whereby the total fluid volume remains substantially constant, the bulb 7, responding to the higher specific gravity of the water surrounding it in the casing, similarly lifts sleeve 6 to actuate switch S and give an alarm to indicate that attention is required.

Obviously, the nature of the trouble is instantly recognizable when an alarm of this character is given since inspection readily reveals that the total fluid volume is within the desired range thus showing that a fluid of higher specific gravity than the lubricant must be present in the casing for switch S to be actuated, a conclusion which can, of course, be verified by opening the drain cock 32 at the bottom of the casing and inspecting the outflow, since water can readily be distinguished from lubricant even if their color characteristics should be the same.

The apparatus requires no resetting after rectification of the condition resulting in an alarm, since any water in the casing is normally drained therefrom in connection with its removal from the main lubricant bath, and after a proper quantity of water-free lubricant is re-introduced to the reservoir the mechanism is restored automatically to its normal condition and so ready to give an appropriate alarm upon subsequent material change in the depth of the lubricant bath or its contamination by water.

While I have herein illustrated and described a preferred embodiment of the invention as employed in association with a bearing lubricant bath of a specific and well-known type, it will be understood it may be utilized with equally good results in other associations and that changes and modifications in the form, construction, arrangement and relationship of the several parts will readily occur to those skilled in the art and may be made if desired without departing from the spirit and scope of the invention as defined in the appended claims.

Having thus described my invention, I claim and desire to protect by Letters Patent of the United States:

1. Alarm switch actuating mechanism comprising a pair of reciprocal switch actuating elements, fluid density responsive means for actuating one of the elements, fluid level responsive means for actuating the other element and second fluid level responsive means normally seated on the first such means operative to actuate the fluid density responsive means independently of the fluid density when said second fluid level responsive means are raised from said first fluid level responsive means.

2. An alarm actuating device comprising a pair of independently operable circuit control switches, reciprocal elements for actuating said switches, a fluid container, fluid supported means disposed therein for moving one of said elements in a direction to actuate the corresponding switch in response to a lowering of the normal fluid level in the container, fluid density responsive means for actuating the other element in response to displacement of a portion of said fluid by a fluid of greater density, and means normally seated on said fluid level responsive means operative to actuate the second element independently of the fluid density when the fluid level rises above normal.

3. An alarm actuating device comprising a casing adapted to contain a fluid, two vertically reciprocal switch actuating elements disposed adjacent the upper end of the casing above the normal level of the fluid therein, fluid level responsive means for actuating one of the elements during lowering of fluid level in the casing, fluid density responsive means for actuating the other element on an increase in the density of the fluid in the casing, means for limiting the upward travel of the first fluid responsive means on increase of the fluid level above a predetermined point and a second fluid level responsive means normally carried by the first such means operative on increase in said fluid level above said point to actuate the density responsive means independently of the density of the fluid to thereby actuate the second element in response to said increased fluid level.

4. An alarm actuating device comprising a casing adapted for installation in substantially vertical position, a guide rod extending longitudinally of the casing, a bulb and sleeve assembly slidable on the rod adapted to float at a predetermined level in a liquid of given specific gravity contained in the casing, a switch supported on the casing, means interposed between said assembly and switch operative to actuate the latter on upward movement of said assembly induced by introduction to the casing of another liquid of higher specific gravity, an outer sleeve slidable on the first sleeve, a float fixed thereto adapted to float on the fluid in the casing, a second switch supported on the casing, means interposed between said second switch and said float operative to actuate the switch when said float falls below a predetermined point on diminution of the total volume of fluid in the casing, a second float surrounding the outer sleeve and normally resting on the first float, means carried by said assembly engageable by the second float to lift said assembly and actuate the first switch when the second float rises above a predetermined point independently of the first float as a result of increase in the level of said fluid, and means operative to limit the upward movement of the outer sleeve and first float prior to the independent upward movement of the second float.

5. An alarm actuating device comprising a casing adapted for installation in substantially vertical position, a guide rod extending longitudinally of the casing, a bulb and sleeve assembly slidable on the rod adapted to float at a predetermined level in a liquid of given specific gravity contained in the casing, means associated with said assembly for adjustably varying said level, a switch supported on the casing, means interposed between said assembly and switch operative to actuate the latter on upward movement of said assembly induced by introduction to the casing of another liquid of higher specific gravity, an outer sleeve slidable on the first sleeve, a float fixed thereto adapted to float on the fluid in the casing, a second switch supported on the casing, means interposed between said second switch and said float operative to actuate the switch when said float falls below a predetermined point on diminution of the total volume of fluid in the casing, a second float surrounding the outer sleeve and normally resting on the first float, means carried by the first sleeve engageable by the second float to lift said assembly and actuate the first switch when the second float rises above a predetermined point independently of the first float as a result of increase in the level of said fluid, and means operative to limit the upward movement of the outer sleeve and first float prior to the independent upward movement of the second float.

6. An alarm actuating device comprising a casing adapted for installation in a substantially vertical position, a guide rod extending longitudinally of the casing, a pair of switches mounted adjacent the top of the casing, a sleeve and bulb assembly slidable on said rod adapted to float at a predetermined level in the casing when the latter contains fluid of given specific gravity, means interposed between said sleeve and one of said switches for actuating the latter when said assembly rises as a result of introduction to the casing of fluid of higher specific gravity, an outer sleeve slidable on the first sleeve, a float fixed to the second sleeve adapted to float on the fluid in the casing, means interposed between the outer sleeve and the other switch operative to actuate the latter when said float falls a predetermined distance as a result of diminution in the normal level of said fluid, a second float freely slidable on the second sleeve, a stop limiting upward movement of the second sleeve and float, and means carried by the bulb and sleeve assembly engageable by the second float to lift said assembly and actuate the first switch when the second float rises a predetermined distance above the first float when in its upper limit position as the result of an increase of the normal level of said fluid.

7. An alarm device comprising a casing adapted for installation in a substantially vertical position and having a fluid inlet at its lower end, a guide rod extending longitudinally of the casing, a pair of switches mounted adjacent the upper end of the casing, an inner sleeve slidable on the rod having a float bulb fixed at its lower end adapted to support the sleeve at a predetermined height with respect to the casing when disposed in a fluid of given specific gravity standing at a given level in the casing, means interposed between said sleeve and one of said switches for actuating the latter when the bulb rises a predetermined distance as a result of introduction to the casing of fluid of higher specific gravity, an outer sleeve surrounding the inner sleeve, a float fixed to the outer sleeve, a second float movable on the outer sleeve independently of the first float and adapted to normally rest on the latter, the first float supporting the second float and outer sleeve at a predetermined height in the casing when the fluid therein is at the aforesaid given level, means interposed between the outer sleeve and the other switch for actuating the latter when the outer sleeve and floats fall on reduction of that level, a stop limiting upward movement of the first float and outer sleeve and means carried by the inner sleeve extending into the path of independent movement of the second float for engagement thereby after the first float attains the limit of its upward movement and the second float continues to rise independently upon an increase in the height of the fluid in the casing above the aforesaid given level whereby to cause the second float to lift the inner sleeve and bulb assembly and actuate the first switch.

CLOY GAHAGAN.

REFERENCES CITED

The following references are of record in the file of this patent:

UNITED STATES PATENTS

| Number | Name | Date |
|---|---|---|
| 438,598 | Ashton | Oct. 21, 1890 |
| 1,066,429 | Gustin | July 1, 1913 |
| 2,419,942 | Brewer | May 6, 1947 |